(12) United States Patent
Brown et al.

(10) Patent No.: US 11,301,803 B1
(45) Date of Patent: Apr. 12, 2022

(54) INVENTORY AND SALES PROCESS CONTROL AND DISPLAY

(71) Applicant: ECMD, Inc., North Wilkesboro, NC (US)

(72) Inventors: Steven Brown, Moravian Falls, NC (US); J. Allen Dyer, Wilkesboro, NC (US); Sankar Muthuvelayutham, Mooresville, NC (US)

(73) Assignee: ECMD, Inc., North Wilkesboro, NC (US)

( * ) Notice: Subject to any disclaimer, the term of this patent is extended or adjusted under 35 U.S.C. 154(b) by 509 days.

(21) Appl. No.: 14/658,499

(22) Filed: Mar. 16, 2015

Related U.S. Application Data

(60) Provisional application No. 61/954,074, filed on Mar. 17, 2014.

(51) Int. Cl.
*G06Q 30/00* (2012.01)
*G06Q 10/08* (2012.01)
*G06Q 30/06* (2012.01)

(52) U.S. Cl.
CPC ....... *G06Q 10/087* (2013.01); *G06Q 30/0633* (2013.01)

(58) Field of Classification Search
CPC ... G06Q 10/087; G06Q 30/0601–0645; G06Q 30/00; G06Q 30/0633; G06Q 30/0641; G06Q 30/0643
USPC .......................................... 705/26.8, 26.1–27
See application file for complete search history.

(56) References Cited

U.S. PATENT DOCUMENTS

| | | | | |
|---|---|---|---|---|
| 5,319,542 A | * | 6/1994 | King, Jr. | G06Q 10/087 705/26.61 |
| 6,978,273 B1 | * | 12/2005 | Bonneau | G06Q 30/02 |
| 7,433,832 B1 | * | 10/2008 | Bezos | G06Q 10/10 705/26.8 |
| 7,778,890 B1 | * | 8/2010 | Bezos | G06Q 30/0633 705/26.1 |

(Continued)

FOREIGN PATENT DOCUMENTS

KR 101325625 B1 * 11/2013 ............. G06K 17/00

OTHER PUBLICATIONS

Ananth Raman et al, "The Achilles' Heel of Supply Chain Management" Harvard Business Review, (2001) (Year: 2001).*

(Continued)

*Primary Examiner* — Christopher B Seibert
(74) *Attorney, Agent, or Firm* — MacCord Mason PLLC

(57) ABSTRACT

A system for inventory and sales process control and display. The improved system for inventory includes a first database with a list of pre-assigned machine-readable code, a second database with a list of items, and a pricing database associated with each of the list of items in the second database. The second database is foreign keyed by machine-readable code number to the first database to associate one or more items listed in the second database with each of the pre-assigned machine-readable code. A query of the first database for a specific pre-assigned machine-readable code generates the associated list of items from the second database for that specific pre-assigned machine-readable code and a price for each of the items in the associated list of items. The system may also include at least one remote user interface.

17 Claims, 13 Drawing Sheets

(56) References Cited

U.S. PATENT DOCUMENTS

| | | | | |
|---|---|---|---|---|
| 8,370,203 B2* | 2/2013 | Dicker | ............... | G06Q 30/0631 705/14.53 |
| 2001/0037258 A1* | 11/2001 | Barritz | ............... | G06Q 30/0641 705/27.1 |
| 2001/0037261 A1* | 11/2001 | Ishitsuka | ............... | G06Q 30/06 705/26.81 |
| 2003/0177072 A1* | 9/2003 | Bared | ............... | G06Q 30/0635 705/26.81 |
| 2003/0233425 A1* | 12/2003 | Lyons | ............... | H04L 29/12009 709/217 |
| 2004/0133542 A1* | 7/2004 | Doerksen | ............... | G06F 40/174 |
| 2005/0216304 A1* | 9/2005 | Westphal | ........... | G06Q 30/0601 705/26.1 |
| 2005/0289039 A1* | 12/2005 | Greak | ............... | G06Q 30/0609 705/37 |
| 2007/0276721 A1* | 11/2007 | Jackson | ............. | G06Q 30/0253 705/14.51 |
| 2007/0282693 A1* | 12/2007 | Staib | ................. | G06Q 30/0621 705/26.5 |
| 2008/0071640 A1* | 3/2008 | Nguyen | ............. | G06Q 30/0226 705/14.27 |
| 2009/0192945 A1* | 7/2009 | Perpina | ................. | G06Q 30/06 705/80 |
| 2009/0292584 A1* | 11/2009 | Dalal | ..................... | G06Q 30/02 705/7.29 |
| 2010/0083217 A1* | 4/2010 | Dalal | ................... | G06F 3/0482 717/106 |
| 2010/0191582 A1* | 7/2010 | Dicker | ............... | G06Q 30/0633 705/14.51 |
| 2011/0040649 A1* | 2/2011 | Dooley | ............. | G06Q 30/0641 705/26.5 |
| 2011/0040655 A1* | 2/2011 | Hendrickson | ...... | G06Q 30/0619 705/27.1 |
| 2011/0125569 A1* | 5/2011 | Yoshimura | ............. | G06Q 30/06 705/14.36 |
| 2012/0166964 A1* | 6/2012 | Tseng | ...................... | G06F 3/048 715/745 |
| 2012/0173351 A1* | 7/2012 | Hanson | .................. | G06Q 20/12 705/17 |
| 2012/0290448 A1* | 11/2012 | England | ............. | G06Q 30/0282 705/27.2 |
| 2013/0006788 A1* | 1/2013 | Zhou | ...................... | G06Q 30/02 705/26.1 |
| 2013/0041781 A1* | 2/2013 | Freydberg | .............. | G06Q 30/06 705/27.1 |
| 2013/0211968 A1* | 8/2013 | Patro | ...................... | G06Q 30/06 705/27.1 |
| 2013/0262193 A1* | 10/2013 | Sundaresan | ............ | G06Q 10/10 705/12 |
| 2013/0268377 A1* | 10/2013 | Jessup | .................... | G06Q 50/01 705/14.73 |
| 2013/0311315 A1* | 11/2013 | Zises | .................. | G06Q 30/0605 705/26.2 |
| 2014/0100991 A1* | 4/2014 | Lenahan | ............ | G06Q 10/0833 705/26.62 |
| 2014/0143090 A1* | 5/2014 | Deyle | .................. | G06Q 30/0609 705/26.35 |
| 2014/0164185 A1* | 6/2014 | Jung | .................. | G06Q 30/0601 705/26.61 |

OTHER PUBLICATIONS

Maslov, Sergei. "Simple model of a limit order-driven market." Physica A: Statistical Mechanics and its Applications 278.3-4 (2000): 571-578. (Year: 2000).*

* cited by examiner

| Gears Scan Code: 000049 | Description: EC 49 | | |
|---|---|---|---|
| | | Media Type: Display | Use Categories: False |
| Show 20 | | Search by item/description | |
| Sequence | Item Number | Item Description | ..Item Display Category |
| 1 | 040492 | EC 49PRM CROWN 3-5/8 | ..Primed Crown |
| 2 | 80484928 | BEC 49 PRM PIN CROWN 3-5/8 8 | ..Primed Crown |
| 3 | 804049212 | BEC 49 PRM PIN CROWN 3-5/8 12 | ..Primed Crown |
| 4 | 040495 | EC 49 PRM LOF CROWN 3-5/8 | ..MDF Primed Crown |
| 5 | 00049 | EC 49 FJ PIN CROWN 3-5/8 | ..FJ Primed Crown |
| 6 | 8100498 | BEC 49 FJ PIN CROWN 3-5/8 | ..FJ Primed Crown |
| 7 | 00049 | EC 49 SOL PIN CROWN 3-5/8 | ..Solid Pine Crown |
| 8 | 03049 | EC 49 SOL OAK CROWN 3-5/8 | ..Solid Oak Crown |
| 9 | 07049 | EC 49 KNT ALD CROWN 3-5/8 | ..Alder Mouldings |

Showing 1 to 9 of 9 enteries      First Previous 1 Next Last

FIG. 4

| Item# | Description | Each Prc | Qty/Break | Qty/Prc |
|---|---|---|---|---|
| 044002 | EC 1 PRM CASNG 3-1/2 | 83.58 | 6,912 | 64.81 |
| 04400217 | EC 1 PRM CASNG 3-1/2 17 | 83.58 | 6,912 | 65.14 |
| 28044002 | EC 1 PRM CASNG 3-1/2 88" | 6.60 | 324 | 4.69 |
| 044005 | EC 1 PRM LDF CASNG 3-1/2 | 57.91 | 6,336 | 45.95 |
| 10400 | EC 1 FJ PIN CASNG 3-1/2 | 78.83 | 6,912 | 60.78 |
| 1040017 | EC 1 FJ PIN CASNG 3-1/2 17 | 78.83 | 6,912 | 60.93 |
| 28400 | EC 1 FJ PIN C ASNG 3-1/2 88" | 6.24 | 324 | 4.63 |
| 00400 | EC 1 SOL PIN CASNG 3-1/2 | 155.21 | | |

INVENTORY AND SALES PROCESS CONTROL AND DISPLAY

This application claims the benefit of U.S. Provisional Application No. 61/954,074, filed Mar. 17, 2014, which is herein incorporated by reference.

BACKGROUND

Field

The present inventions are directed to systems for inventory, and more particularly, to improved commercial selection and sales systems and methods.

Related Art

Inventory and price management is becoming increasingly important in today's electronic economy. Many industries implement systems to electronically inventory and characterize product options, point of sale data, and similar transaction components to improve sales efficiency. Within industries featuring a variety of product selection choices, reference codings have been utilized to simplify the process. For instance, individual marketing materials often refer to many stock-keeping units (SKUs), which are unique identifiers for distinct size, material, makeup, etc.

However, these traditional inventory systems fail to deliver efficient and prompt selection choices for the customer, particularly within industries supporting a significant variety of selection choices and options under a major functional set. For instance, conventional marketing material may illustrate a look or major functional set represented by a significant number of individual SKUs. Under these systems, retail sales support have the customer select an image or design, and then the sales support must repeatedly refer to a catalog to provide the variant SKUs for that product. The inefficiency of traditional systems is further complicated when the sales support must produce multiple iterations of product availability and associated price components as the order is altered during the selection process.

Therefore, Applicants desire systems for inventory without the drawbacks presented by the traditional systems and methods.

SUMMARY

The present inventions are directed to an improved system for inventory and sales process control and display.

Accordingly, one aspect of the present inventions is to provide a system for inventory and sales process control and display having a first database with a list of pre-assigned machine-readable codes, a second database with a list of items, and a pricing database. The pricing database is associated with each of the list of items in the second database. The second database is foreign keyed by machine-readable code number to the first database to generally associate one or more items listed in the second database with each of the pre-assigned machine-readable code. Typically, a query of the first database for a specific pre-assigned machine-readable code retrieves the associated list of items from the second database for that specific pre-assigned machine-readable code and a price for each of the items in the associated list of items.

In one embodiment, the second database's list of items associated to specific pre-assigned machine-readable code in the first database is a relational database. For instance, the relational database may include a plurality of machine-readable code numbers that are foreign keyed to the first database and includes at least one valid SKU associated with each of the machine-readable code numbers. Typically, at least two valid SKUs are associated with each of the machine-readable code numbers. The SKUs may be validated against an inventory and pricing database. The second database may include a list of items associated to specific pre-assigned to machine-readable code is sorted by SKUs. The sorting of the SKUs may be by predetermined order. In particular examples, the predetermined order for sorting the SKUs includes popularity, price, overstock, time frame for availability, the like, and combinations thereof.

In some embodiments, the system may include associated images for the SKUs. The associated images may be digital images that are resized according to display parameters. Further, the pricing database may be associated with each of the list of items in the second database, and includes a valid customer number and a pricing black box. In certain examples, the pricing black box includes a customer input to the pricing black box. The customer input may be based on several categories and combinations thereof. The pricing black box may include an item input to the pricing black box. The item input may include a customer item, item price group, the like, and combinations thereof. Further, the pricing black box may include a quantity input to the pricing black box.

Another aspect of the present inventions is to provide a system for inventory and sales process control and display having a first database including a list of pre-assigned machine-readable codes and a second database including a list of items. The second database is foreign keyed by machine-readable code number to the first database to associate one or more items listed in the second database with each of the pre-assigned machine-readable code. Typically, a query of the first database for a specific pre-assigned machine-readable code retrieves the associated list of items from the second database for that specific pre-assigned machine-readable code.

In one embodiment, the system includes a user interface. The user interface may be an interactive user interface. The interactive user interface may include an optical scanner for input of pre-assigned machine-readable code. The interactive user interface may include an electronic shopping cart. The user interface may be a web-based user interface. In certain examples, the web-based user interface is connected to a remote terminal.

In one embodiment, the first database's list of pre-assigned machine-readable code is a relational database including a plurality of machine-readable code numbers, a machine-readable code entry description, and an owner. The owner may be a separate company subsidiary unit. The system may further include a machine-readable code number assignment module. The machine-readable code number assignment module may assign the machine-readable code in sequential order. The machine-readable code number assignment module may assign the machine-readable code in user requested order. The machine-readable code number availability module may compare a user requested machine-readable code number to a list of previously assigned machine-readable code numbers prior to assigning the user requested machine-readable code. The machine-readable code number assignment module further includes a categorization field.

Still another aspect of the present inventions is to provide a system for inventory and sales process control and display having a first database including a list of pre-assigned machine-readable code, a second database including a list of items, a pricing database associated with each of the list of items in the second database, and a user interface. The second database is foreign keyed by machine-readable code number to the first database to associate one or more items listed in the second database with each of the pre-assigned machine-readable codes. Typically, a query of the first database for a specific pre-assigned machine-readable code retrieves the associated list of items from the second database for that specific pre-assigned machine-readable code and a price for each of the items in the associated list of items.

These and other aspects of the present inventions will become apparent to those skilled in the art after a reading of the following description of the embodiments and examples when considered with the drawings.

BRIEF DESCRIPTION OF THE DRAWINGS

FIG. 4 is a screenshot from a user interface of a machine-readable code assignment maintenance application according to one embodiment of the disclosure;

DESCRIPTION OF THE EMBODIMENTS

Figure 1:
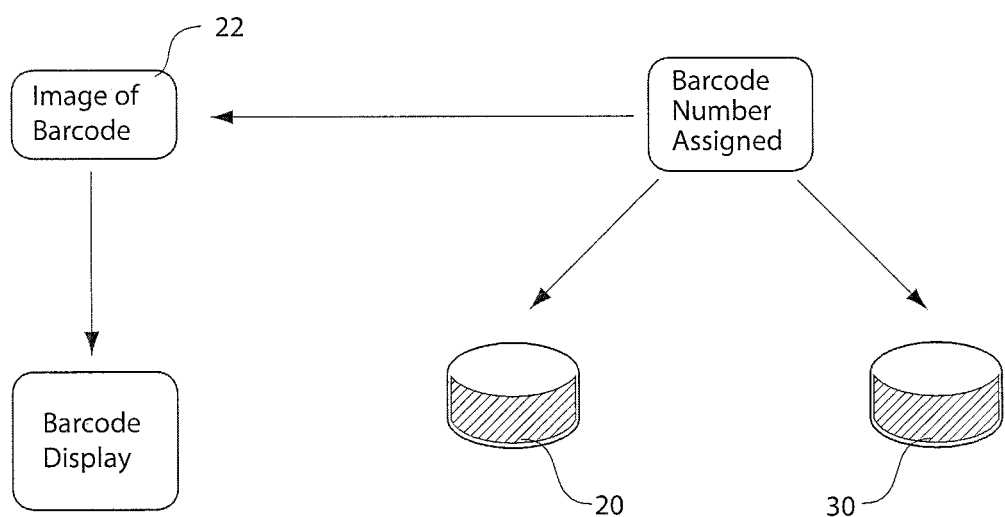
FIG. 1 is a flowchart of machine-readable code assignment and display according to one embodiment of the disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2:
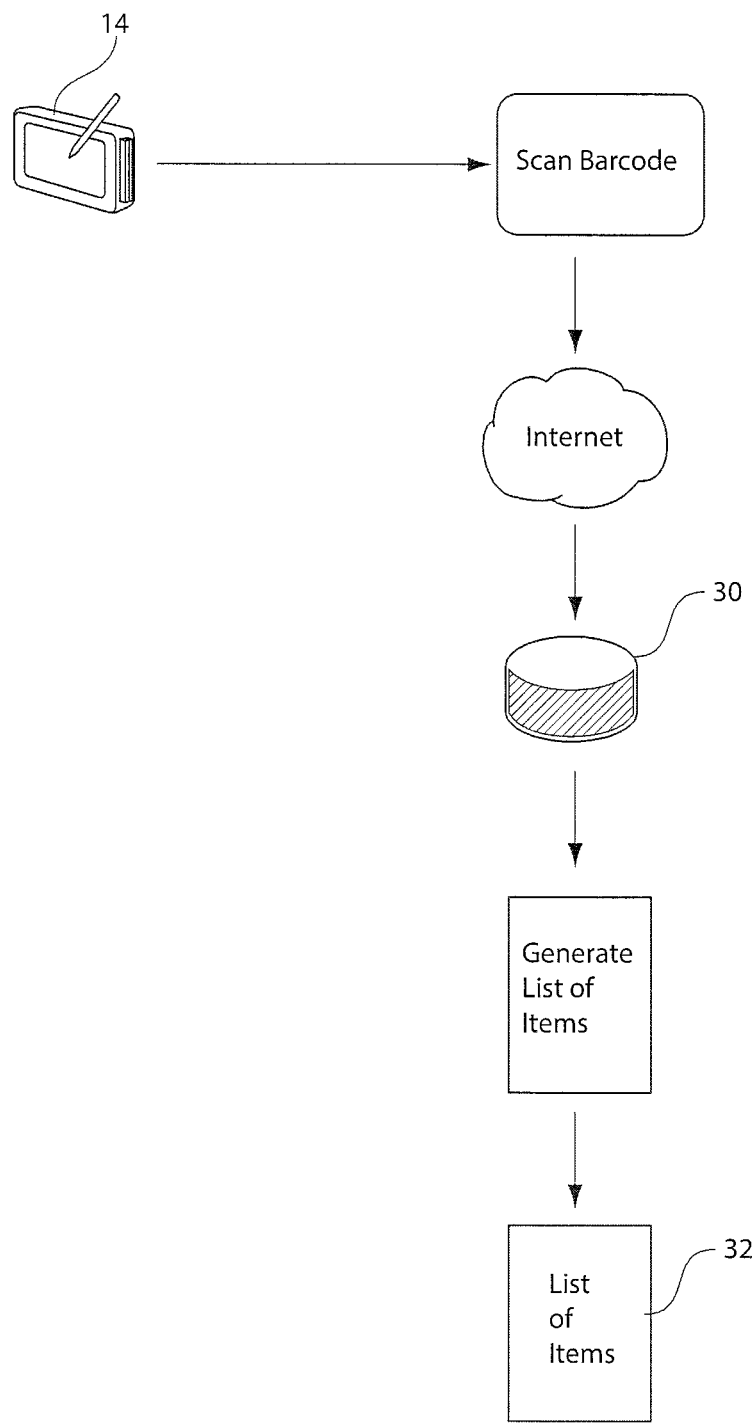
FIG. 2 is a flowchart of system procedures to generate a listing of items according to one embodiment of the disclosure.
Figure 3:
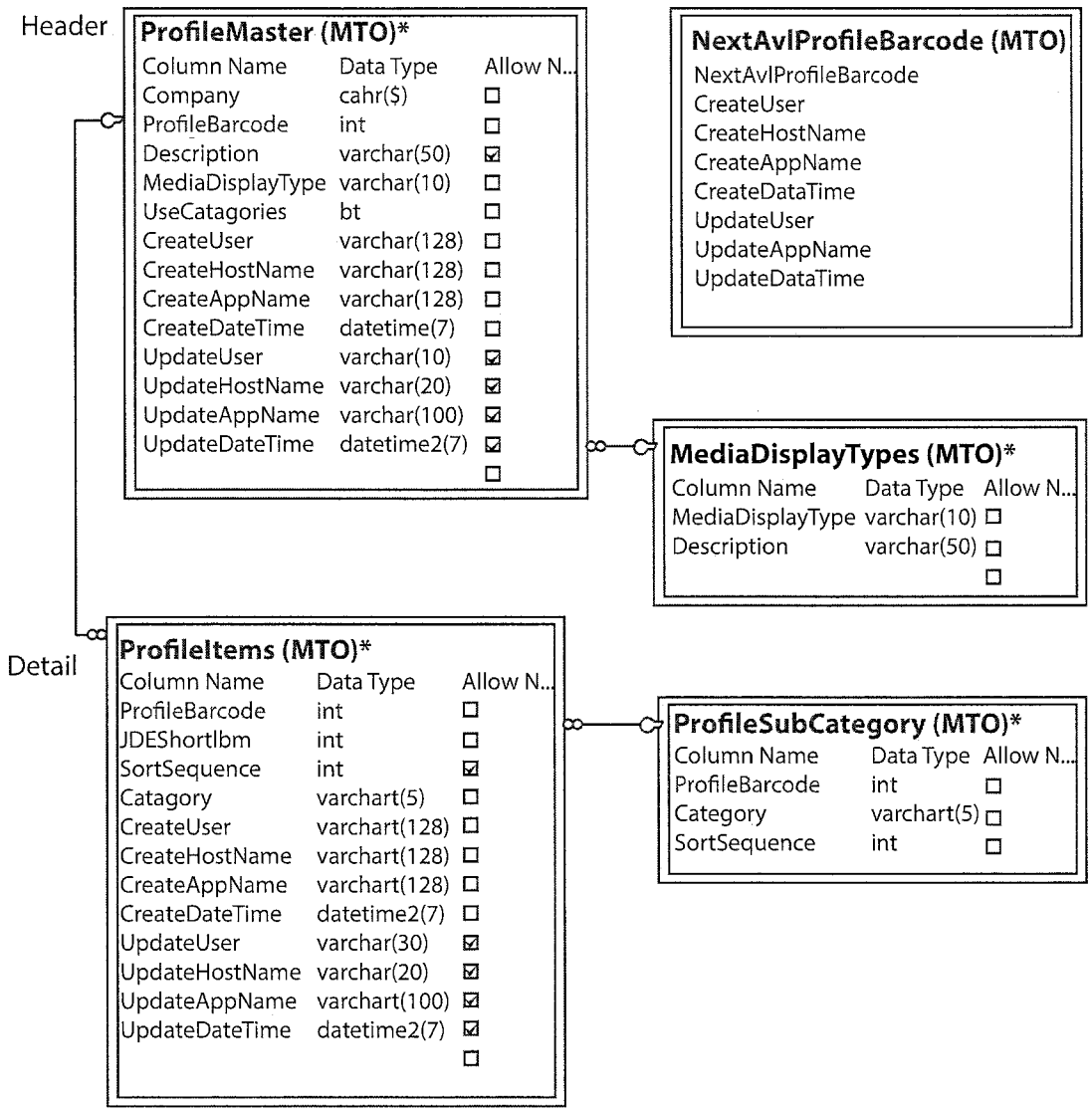
FIG. 3 is database diagram according to one embodiment of the disclosure.

Turning to the Figures in general, and FIGS. 1 through 3 in particular, the present inventions are directed to a system for inventory, generally designated 10. The system for inventory 10 manages a supply chain, which includes a management module and a remote user interface module. Generally, the management module defines assigned inventory characteristics and pricing matrices, while use of the remote user interface module generates a list of items and associated customer-specific data for retail selection and selling purposes. Typically, the system for inventory 10 comprises a first database 20 with assigned barcodes 16, a second database 30 with assigned items 32 for each barcode 16, and a pricing database 50. Generally, a remote user interface 14 allows users to scan the barcode 16 to generate a screen showing item selection options and features, availability, and customer-specific cost to streamline the quoting and ordering process.

As used herein, the term "users" may refer interchangeably to customer users, sales users, and support staff users as designated.

As shown in FIGS. 1 and 3, the first database 20 includes pre-assigned machine readable codes 22. Those of ordinary skill in the art having the benefit of this disclosure will recognize the machine readable codes 22 may include any common, non-application specific machine readable barcodes 16 and the like. In certain examples, the machine readable codes 22 are Code 128 barcodes, 3 of 9 barcodes, and the like. The machine readable codes 22 do not imply a specific usage, like UPC, i2of5, or UCC 128 formats. Instead, as shown and described herein, the management module assigns and tracks the underlying encoded reference numbers. The machine readable codes 22 in the first database 20 are unique and include any variation of assignment logic. In one example, the machine readable code 22 includes a length of about four digits to about eight digits, including six digits; however, other examples include any number of digits that fit within any of the barcode sizing constraints shown and described herein. FIG. 4 illustrates one example of a machine readable code 22 assignment maintenance application.

The first database 20 generally retains a list of items 32 associated with an issued encoded number and the display sequence to be used to display the listing of items. The machine readable codes 22 are assigned to the first database 20 based on a relationship database 24.

In one example, the relational database 24 includes a plurality of machine-readable code numbers 26. The machine-readable code numbers 26 typically includes a code entry description 28. Further, the machine-readable code numbers 26 may include an owner association 160. The owner association 160 may be linked to one or a plurality of subsidiaries, divisions or the like associated with the given machine readable code numbers 26. Those of ordinary skill in the art having the benefit of this disclosure will recognize the owner association 160 may be a separate company subsidiary unit or similar secondary association group.

Further, the relational database 24 may include a machine-readable code number assignment module 80. The assignment module 80 generally assigns a unique readable code. For instance, the assignment module 80 may assign machine-readable codes in sequential order 82. In addition, the assignment module 80 may assign machine-readable code in user-requested order 84.

In particular embodiments, the assignment module 80 may include a machine-readable code availability module 86. The machine-readable code availability module 86 may populate machine-readable code in a variety of ways. In one particular example, the machine-readable code availability module populates machine-readable code based on categorization fields 88 based on industry-specific categorization as understood by those skilled in the art.

In some embodiments, the first database 20 may include a media display type entry to designate a type of media. Typically, the media display type is validated, i.e. foreign keyed of, against a media display type table to further distinguish where the machine readable code 22 is to be used for management purposes. In yet further embodiments, the first database 20 may include use categorization limitations to minimize, or eliminate, overly extensive lists of items 32 shown and described herein. Typically, the use categorization limitations simplify list of items 32 that would otherwise prove too cumbersome to navigate.

Figure 5:
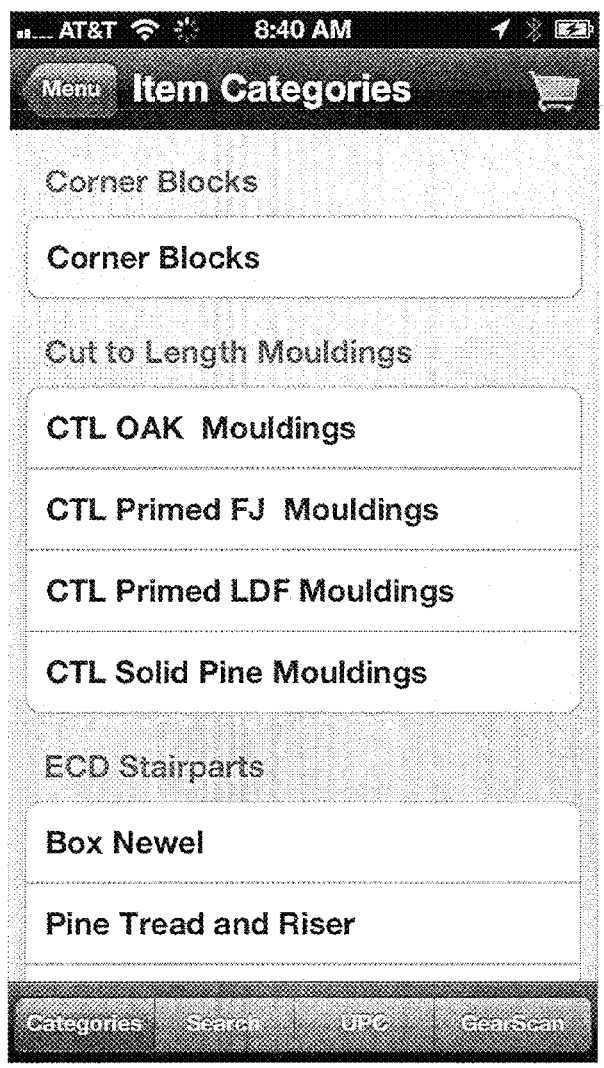
FIG. 5 is a screenshot from a user interface of a resulting item list according to one example of the disclosure.

As shown in FIGS. 1, 2 and 5 the second database 30 includes pre-assigned items 32 for each machine readable codes 22, i.e. barcodes 16 and the like. The pre-assigned items 32 for each machine readable codes 22 in the second database 30 are validated against, i.e. foreign keyed of, by machine-readable code number. Those of ordinary skill in the art having the benefit of this disclosure will recognize a variety of categories and arrangements of the list of items 32 assigned in the second database 30. Typically, the list of items 32 includes a description of the pre-assigned machine readable codes 22 designations. For illustrative purposes only, the description may designate a molding profile, i.e. 'profile 1234 on the 2014 molding display.'

In one embodiment the list of items 32 foreign keyed by machine-readable code number may include specific pre-assigned machine readable code 34, a relational database 36, and sorted by SKUs. In one example, the relational database 36 may include machine readable code numbers that are foreign keyed to the first database 20. The relational database 36 therefore includes at least one valid SKU 42; however, typically two valid SKUs 44a, 44b are associated with each of the machine-readable code numbers. In certain examples, the two valid SKUs 44a, 44b are validated against the inventory and pricing database 40 shown and described herein.

Typically, the list of items 32 in the second database are sorted by SKUs. In one example, the items 32 in the second database are sorted in a predetermined order 60, for instance according to popularity 62, price 64, overstock 66, time frame for availability 68, and the like. In some examples, the list of items in the second database may include associated images 70, for instance digitized images 72. Any of the images shown and described herein may be resized according to display parameters 74 of the databases and/or remote user interface 14 constraints.

In particular embodiments, the pricing database 50 includes a valid customer number 54 and a pricing black box 52. The pricing black box 52 typically includes a variety of pricing-related matrix inputs used to generate the pricing outputs shown and described herein. For instance, the pricing black box 52 may include a customer input 90, an item input 110, a quantity input 120, and the like. In certain examples, the customer input 90 may be populated with a variety of categories. In particular examples, the categories may include, but are not limited to, a variety of brand and loyalty components 92, a variety of organization, alignment, and other segment components 94, geographic, size, and structure component 96, and similar components. In some examples, the item input 110 in the pricing black box 52 may include a customer item 112, an item price group 114, and similar input components.

Figure 6:
FIG. 6 is another screenshot from a user interface of a resulting item list according to one example of the disclosure.
Figure 7:
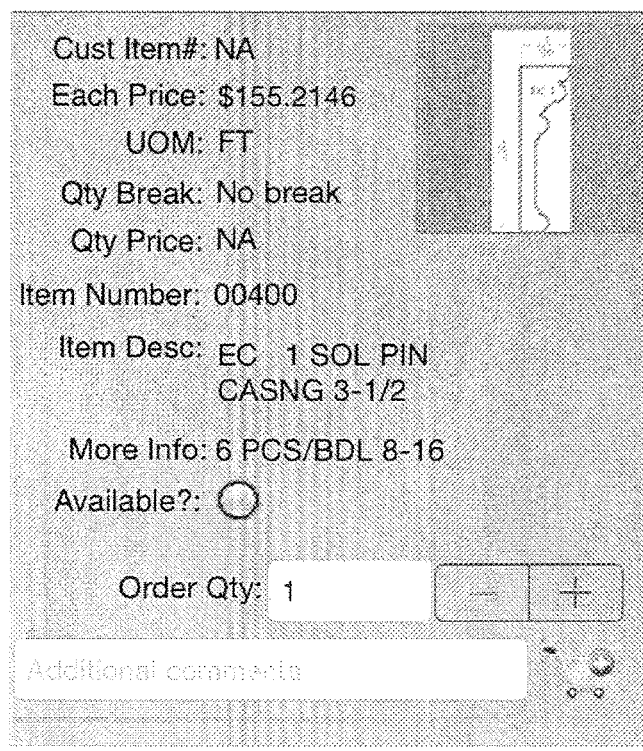
FIG. 7 is yet another screenshot from a user interface of a resulting item list, showing a single item, according to one example of the disclosure.

Typically, a query 56 of specific pre-assigned machine-readable code retrieves associated list of items pricing for each of items in the associated list of items 32. For instance, FIGS. 6 and 7 illustrate associated list of items 32 generated by the system with customer-specific pricing. In particular, FIG. 6 shows a scanned result from a supplier database that produced associated list of items and corresponding customer pricing. FIG. 7 illustrates another list of items 32 on an itemized detail screen on a user interface 14 as shown and described herein.

Embodiments of the management module therefore systematically and dynamically populate and manage pricing conditions of individual items for pre-assigned customers. Typically, the management module allows secure users to perform operations and communication commands, provide instructions, and provide a variety of inputs to facilitate the completion of the inventory selections shown herein.

Figure 8A:
FIG. 8a is an example of a machine-readable code according to one embodiment of the disclosure.
Figure 8B:
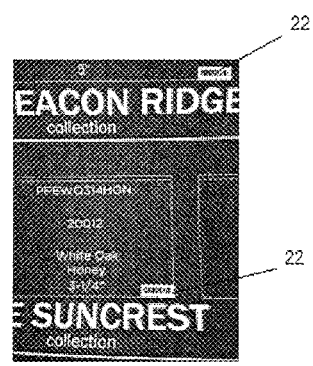
FIG. 8b is an example of the machine-readable code in FIG. 8a secured on a display.
Figure 8C:
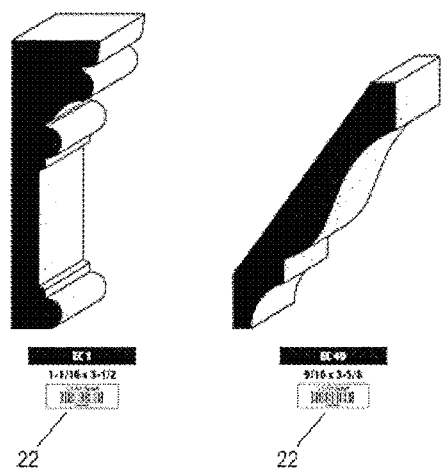
FIG. 8c is an example of the machine-readable code in FIG. 8a positioned in a catalog.
Figure 8D:
FIG. 8d is an example of the machine-readable code in FIG. 8a secured on marketing material.

Any of the machine-readable codes 22 herein, for instance as illustrated in FIG. 8a, may be positioned on any catalogs, marketing materials, sales promotions, product samples, and the like in a variety of configurations. FIG. 8b shows the machine codes 22 secured on a display board. FIG. 8c shows the machine codes 22 positioned in a catalog page. FIG. 8d illustrates the machine-readable code 22 secured underneath a product sample, for instance on a display presentation in a showroom setting or similar environment.

Figure 9:
FIG. 9 is a screenshot from a user interface according to one example of the disclosure.
Figure 10:
FIG. 10 is a screenshot from a user interface according to one example of the disclosure.
Figure 11:
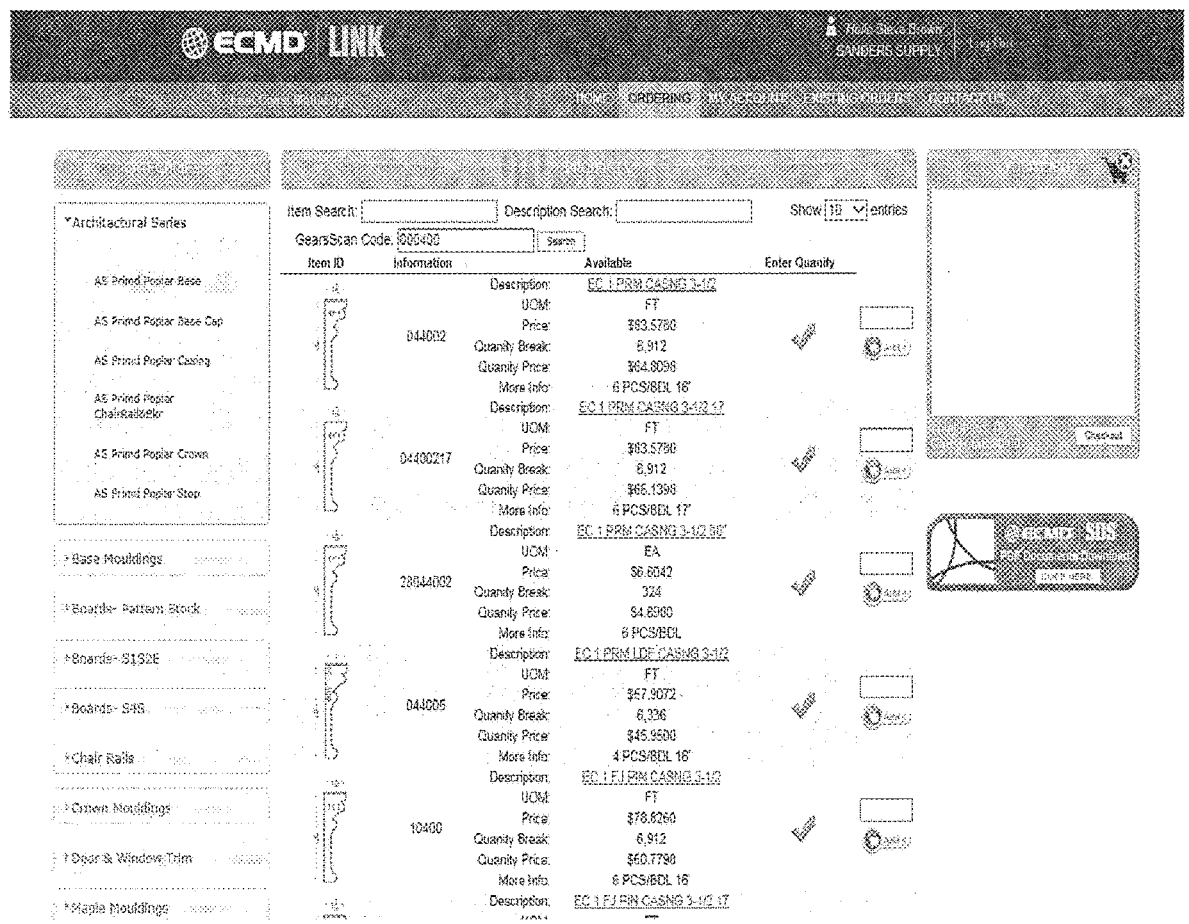
FIG. 11 is a screenshot from a self-service website user interface according to one example of the disclosure.

As shown and described herein, the user interface 14 may be a remote access portal, such as a wireless phone, a computer terminal, or similar electronic user interface in communication with the system. As introduced in FIGS. 9-11, the remote user interface 14 may include an interactive user interface 140. Typically, the interactive user interface 140 allows the user to navigate between a machine-readable code 22 on marketing/sales material to a logically-selected listing of items with associated availability and cost. FIG. 11 illustrates one example of a customer self-service website screenshot of a remote user interface 14, with the machine-readable code 22 keyed in and the associated item list generated by the system as shown and described herein.

Figure 12:
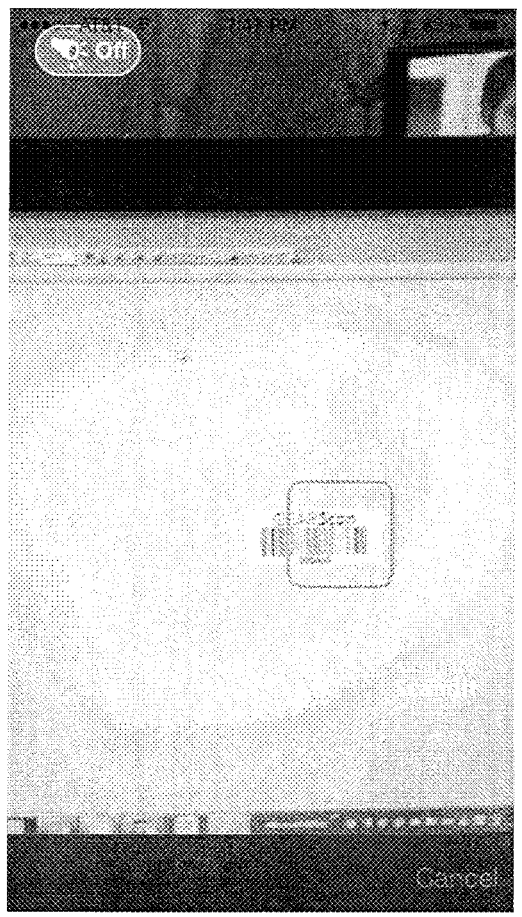
FIG. 12 is a scanning application illustration of a user interface according to one example of the disclosure.

In some examples, the interactive user interface 140 may include an optical scanner 142 to allow a user, for instance a salesperson, customer, or the like, to scan machine-readable code 22 on any of the marketing material as shown in FIG. 12. In other examples, the machine-readable code may be manually entered into any of the systems shown and described herein.

In one example, the machine-readable code 22 is positioned on a molding profile display. Once the machine-readable code 22 is scanned with the optical scanner 142, a display of a list of the dealer's cost and availability of that profile in every species in stock will be generated on the interactive user interface 140. In further examples, the scan may generate additional made-to-order species that are not in stock with the associated non-stock species pricing. In addition, the system may automatically apply a lower price of the made-to-order species when the quantity reaches a predefined threshold.

In addition, the interactive user interface 140 may include an electronic shopping cart 144 to allow users to select items for eventual purchase. In particular embodiments, the electronic shopping cart 144 includes code, for instance HTML code, installed on a server, which hosts at least a portion of the system shown and described herein. For instance, the user may select a particular product generated from the list of items 32 and accumulate a list of products for purchase. Upon checkout, the system calculates a total for the order, including any shipping, taxation, and any handling charges, as applicable.

Typically, any of the web-based user interface 146 shown and described herein are connected to a remote terminal 148. Turning to FIG. 11, the interactive user interface 140 may include a web-based user interface 146. The web-based user interface 146 may include code installed on a server, for instance which hosts at least a portion of the system shown and described herein.

In use, embodiments and examples of the inventory system 10 shown and described herein streamline the customer selection experience to reduce the time and congestion required by conventional systems to complete a selection and/or sales event. Generally, the inventory system 10 allows a management module to populate item and pricing data, as well as provides an inclusive selection display tool. For instance, a scan of the machine-readable codes 22 shown and described herein immediately provides a listing of associated variant SKUs for that product, along with key purchase decision-making data for those SKUs.

In one embodiment, a non-application specific machine-readable code 22 is positioned on a marketing material. The machine-readable code 22 is scanned with a remote user interface 14, which accesses the databases shown and described herein to generate customer-specific pricing in the particular sequence defined by the inventory system. For instance, the end customer may first select the look and/or functionality of a construction material in the marketing material. The look may represent a specific fit to the décor of a room or design. Using the remote user interface 14, the pre-assigned machine-readable codes associated with the selection is scanned. The system then generates a listing, i.e. sample options, of various colors and species that represent a wide number of end product alternative arrangements. Instantaneously, the system provides a customer specific price for the chosen arrangement, availability, and allows the order to be placed to consummate the sale. Unlike traditional systems, this simplified selection and sales process enhances the supply chain, leading to sales efficiency. Generally, in response to commands in the management module, the inventory system 10 enhances the customer experience to reduce the time and congestion required by conventional systems to complete a sales event. In addition, the system for inventory 10 provides a secure, authorized real time connection between a variety of sales and marketing materials 200 to the databases shown and described herein.

Certain modifications and improvements will occur to those skilled in the art upon a reading of the foregoing description. By way of example, certain embodiments may include a retail price on any of the item list screens and item detail screens shown and described herein. For instance, a markup multiplier may be stored in the customer database, and in particular for each customer within the customer database. The markup may be applied to the customer price in order to calculate the retail price. In yet another embodiment, a user may clone any of the past orders generated by the systems and methods shown herein, and load the cloned order into a shopping cart to aid the user in placing repetitive orders, including, but not limited to, common sets of items ordered together. In addition, automatic sortation of frequent ordered items may be generated to a top of any of the item lists shown and described herein. For instance, particular item lists herein may be overridden by frequently ordered items via machine readable code. In other embodiments, any of the systems and methods herein may include special handling charge calculations, for instance user-specific demands. Further examples include printing capabilities, email sharing, and social media sharing as understood by those skilled in the art having the benefit of this disclosure.

It should be understood that all such modifications and improvements have been deleted herein for the sake of conciseness and readability but are properly within the scope of the following claims.

We claim:
1. An assembly comprising:
  (a) a supply of product inventory having a plurality of construction molding items consisting essentially of
    i. a plurality of physical products comprising variable product item species selections, and
    ii. a major functional set associated with a list of said construction molding items; and
  (b) an inventory and sales process control and display comprising:
    (i) a first database including a list of pre-assigned machine-readable codes, wherein said machine-readable codes associated with said list of construction molding items and a display sequence to be used to display said list of construction molding items on a display chosen from the group consisting of a product sample, a display board, a catalog, and a marketing publication, and wherein said first database including a list of pre-assigned machine-readable code is a relational database including a plurality of machine-readable code numbers, a machine-readable code entry description, and an owner; and
    (ii) a supply chain generator second database including a list of items having a molding profile description of said pre-assigned machine-readable code designations, wherein said supply chain generator second database is foreign keyed by machine-readable code number to said first database to associate one or more items listed in said second database with each of said pre-assigned machine-readable code, whereby a query of said first database for a specific pre-assigned machine-readable code generates the associated list of items from said second database for that specific pre-assigned machine-readable code;
  (c) an interactive web-based graphic user interface including an optical scanner for input of pre-assigned machine-readable code and connected to a remote terminal wherein a user selects a variable product item species to display the product sample, the display board, the catalog, and the marketing publication stored in the first database; and
  (d) an electronic shopping cart installed on a server that generates a made-to-order species and automatically applies a lower price to the made-to-order species when a selection reaches a predefined threshold.

2. The assembly according to claim 1, wherein said owner is a separate company subsidiary unit.

3. The assembly according to claim 1, further including a machine-readable code number assignment module.

4. The assembly according to claim 3, wherein said machine-readable code number assignment module assigns said machine-readable code in sequential order.

5. The assembly according to claim 3, wherein said machine-readable code number assignment module assigns said machine-readable code in user requested order.

6. The assembly according to claim 5, further including a machine-readable code number availability module for comparing a user requested machine-readable code number to a list of previously assigned machine-readable code numbers prior to assigning the user requested machine-readable code.

7. The assembly according to claim 3, wherein said machine-readable code number assignment module further includes a categorization field.

8. A system comprising:
  (a) a supply of product inventory having a plurality of construction molding items consisting essentially of i. a plurality of physical products comprising variable product item species selections, and
   ii. a major functional set associated with a list of said construction molding items; and
(b) an inventory and sales process control and display comprising:
   (i) a first database including a list of pre-assigned machine-readable codes, wherein said machine-readable codes associated with said list of construction molding items and a display sequence to be used to display said list of construction molding items on a display chosen from the group consisting of a product sample, a display board, a catalog, and a marketing publication, and wherein said first database including a list of pre-assigned machine-readable code is a relational database including a plurality of machine-readable code numbers, a machine-readable code entry description, and an owner; and
   (ii) a supply chain generator second database including a list of items having a molding profile description of said pre-assigned machine-readable code designations, wherein said supply chain generator second database is foreign keyed by machine-readable code number to said first database to associate one or more items listed in said second database with each of said pre-assigned machine-readable code, whereby a query of said first database for a specific pre-assigned machine-readable code generates the associated list of items from said second database for that specific pre-assigned machine-readable code;
(c) an interactive web-based graphic user interface including an optical scanner for input of pre-assigned machine-readable code and connected to a remote terminal wherein a user selects a variable product item species to display the product sample, the display board, the catalog, and the marketing publication stored in the first database; and
(d) an electronic shopping cart installed on a server that generates a made-to-order species and automatically applies a lower price to the made-to-order species when a selection reaches a predefined threshold.

9. The system according to claim 8, wherein said second database including a list of items associated to specific pre-assigned machine-readable code in said first database is a relational database including a plurality of machine-readable code numbers foreign keyed to said first database includes at least one valid SKU associated with each of said machine-readable code numbers.

10. The system according to claim 9, wherein at least two valid SKUs are associated with each of said machine-readable code numbers.

11. The system according to claim 9, wherein said SKUs are validated against an inventory and price generator.

12. The system according to claim 9, wherein said second database including a list of items associated to specific pre-assigned to machine-readable code is sorted by SKUs.

13. The system according to claim 12, wherein sorting of said SKUs is by predetermined order.

14. The system according to claim 13, wherein said predetermined order for sorting said SKUs is selected from the group consisting of popularity, price, overstock, time frame for availability, and combinations thereof.

15. The system according to claim 9, further including associated images for said SKUs.

16. The system according to claim 15, wherein said associated images are digital images that are resized according to display parameters.

17. The system according to claim 8, wherein said item input is selected from the group consisting of customer item, item price group, and combinations thereof.

* * * * *